Figure 1:
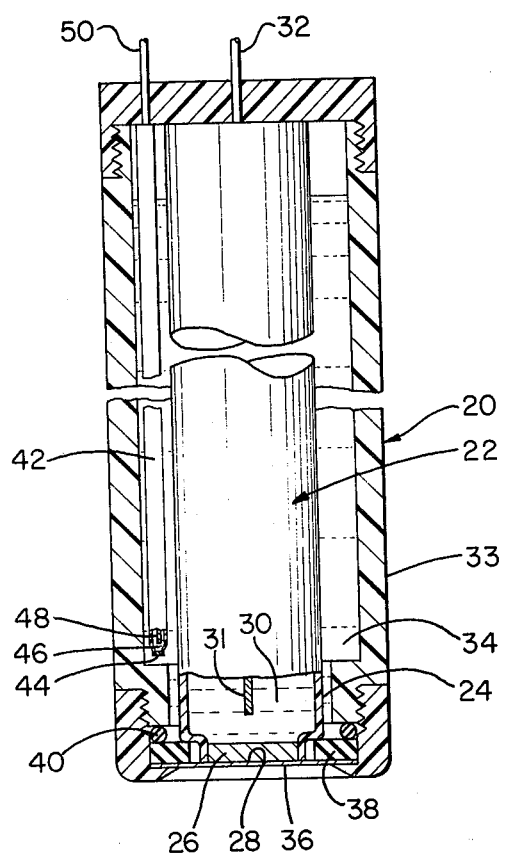

United States Patent [19]

Riseman et al.

[11] 3,897,315
[45] July 29, 1975

[54] METHOD OF DETERMINING HYDROGEN SULFIDE

[75] Inventors: John H. Riseman, Cambridge; Martin S. Frant, Newton; John A. Krueger, Cambridge, all of Mass.

[73] Assignee: Orion Research Incorporated, Cambridge, Mass.

[22] Filed: July 10, 1974

[21] Appl. No.: 487,187

Related U.S. Application Data

[62] Division of Ser. No. 349,231, April 9, 1973.

[52] U.S. Cl. ................................................. 204/1 T
[51] Int. Cl.² ....................................... G01N 27/46
[58] Field of Search ............ 204/1 T, 195 P; 324/29

[56] References Cited
UNITED STATES PATENTS 2,864,747   12/1958   Roth................................... 204/1 T
3,515,658   6/1970   Amdur........................... 204/195 P Primary Examiner—G. L. Kaplan

[57] ABSTRACT

An improved gas-sensing electrochemical cell for measuring dissolved hydrogen sulfide in a sample solution. The cell comprises a potentiometric sulfide ion-sensitive electrode and a fluoride ion-sensitive electrode, both in contact with an acid internal standard solution comprising an aqueous solution of a fluoride salt. A hydrophobic hydrogen sulfide gas-permeable membrane separates the sample solution from the internal solution.

4 Claims, 2 Drawing Figures

METHOD OF DETERMINING HYDROGEN SULFIDE

This is a division of U.S. Pat. application Ser. No. 349,231 filed Apr. 9, 1973.

This invention relates to electrochemical analysis and particularly to analytical devices in which the hydrogen sulfide content of a sample gas in a liquid is measured by potentiometrically monitoring the hydrogen sulfide activity.

Hydrogen sulfide in solution is believed, in its undissociated form, to be highly toxic. It is therefore quite important that one be able to measure the hydrogen sulfide activity as distinct from the sulfide ion activity in a sample solution.

It is known that one can measure the concentration of a gas (such as ammonia) dissolved in aqueous solution, by diffusing the ammonia from the sample liquid through a membrane, which is selectively permeable to ammonia gas, into an electrolyte. The electrolyte has immersed therein a pH electrode and a reference electrode so that a galvanic cell is formed in which the potential developed is related by the well-known Nernst equation to the hydrogen ion activity in the cell. This latter activity is proportional to the logarithm of the partial pressure of the ammonia gas dissolved in the sample. It will be seen that the potential developed by the system is an indirect measure of the ammonia gas activity or concentration.

It is also known that a similar electrochemical system can be used to detect the presence of carbon dioxide. In such a system a pH glass electrode and a reference electrode are immersed in a bicarbonate solution which is separated from the sample medium by a membrane permeable to carbon dioxide. Again, the potential developed across the two electrodes is an indirect measure of the partial pressure of the carbon dioxide in the sample meidum.

A principal object of the present invention is to provide an improved electrochemical cell for measuring the hydrogen sulfide content of samples. Another object of the present invention is to provide a hydrogen sulfide sensor which rapidly and accurately measures the activity of hydrogen sulfide in a sample medium.

Generally, the hydrogen sulfide sensor of the present invention is an electrochemical cell of the general type described above but which differs in that it directly responds to the sulfide ions formed by ionization of hydrogen sulfide in a particular electrolyte. Accordingly, the sensor of the invention includes a sulfide sensitive electrode as the sensing element, a reference electrode which preferably will not chemically react with sulfide ions, a gas permeable membrane positioned immediately adjacent to the sensing surface of the sulfide electrode, and an electrolyte electrochemically coupling both the reference and sensing electrodes.

The sulfide electrode employed in the present invention as the sulfide ion-sensing element is substantially that described in U.S. Pat. No. 3,672,962 issued June 27, 1972 to M. S. Frant and J. W. Ross.

Such a sulfide-sensing electrode is characterized in that the sulfide sensitive portion thereof is essentially a dense, imporous pellet or membrane of substantially pure $Ag_2S$, at least the surface of which is intended to contact the solution having sulfide-ions being free from any metal, particularly silver. Such sulfide electrodes, which are commercially available from Orion Research Incorporated, Cambridge, Massachusetts, exhibit a substantially Nernstian (divalent) response to the activity of sulfide ions in solution. However, it is known that the response of such sulfide electrodes is adversely affected when working with sample media which are highly alkaline or which contain large amounts of reducing agents, apparently because of liquid junction potential problems or because the reducing agents chemically attack the $Ag_2S$ membrane. However the use of a gas permeable membrane in the present invention allows such sulfide electrodes to be used with solutions which are highly alkaline and which may contain large amounts of reducing agents because the gas permeable membrane serves to prevent attack upon the $Ag_2S$ pellet by the agents.

Figure 2:
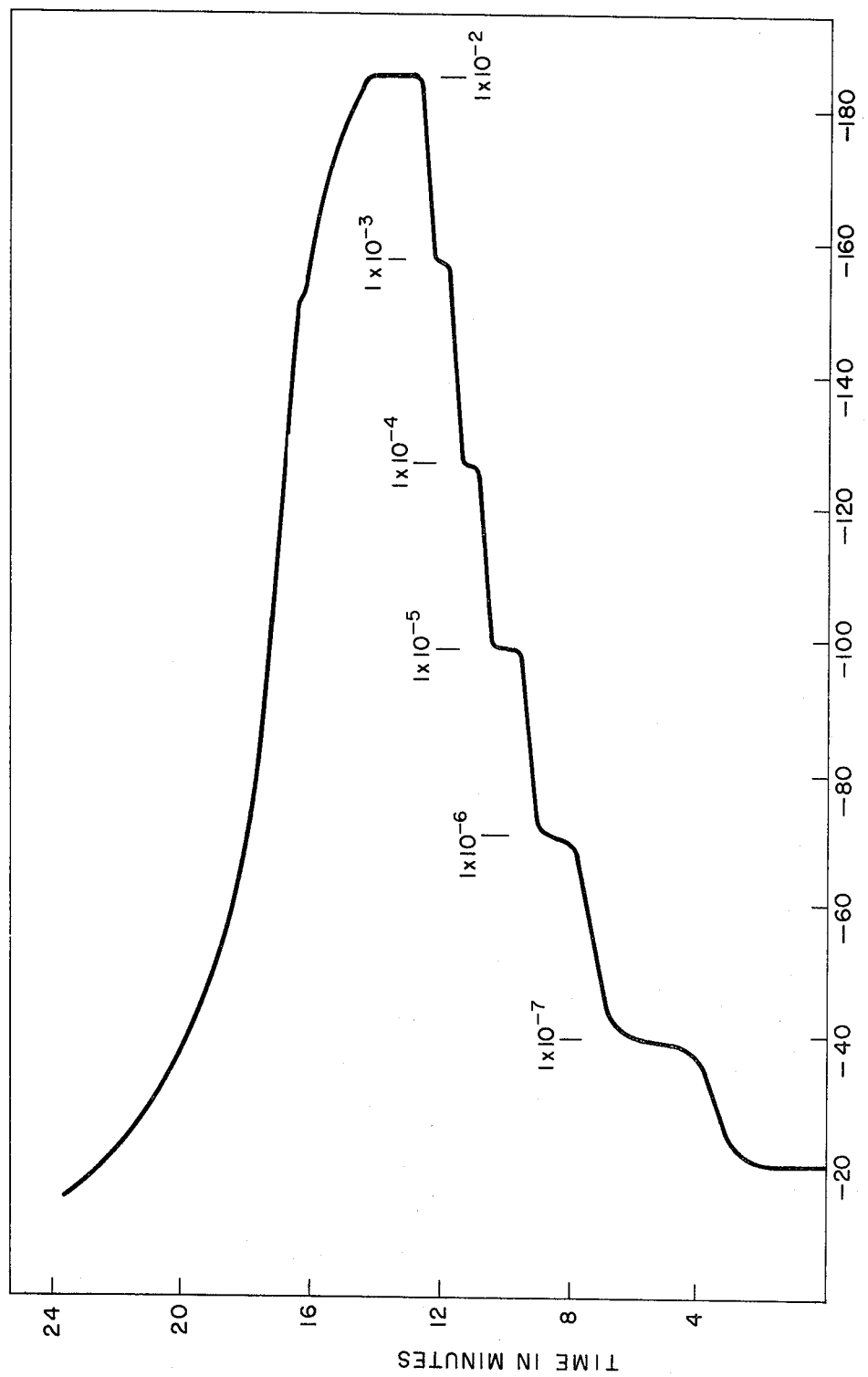

Other objects of the invention will in part be obvious and will in part appear hereinafter. The invention accordingly comprises the apparatus possessing the construction and arrangement of elements, and the process including the several steps and relation of one or more of such steps with respect to the other, all of which are exemplified in the following detailed disclosure and the scope of the application of which will be indicated in the claims. For a fuller understanding of the nature and objects of the present invention, reference should be had to the following detailed description taken in connection with the accompanying drawings wherein:

FIG. 1 is an idealized cross-section taken through a hydrogen sulfide sensor embodying the principles of the present invention; and FIG. 2 is a graph of time versus voltage indicating the response of a hydrogen sulfide sensor to various concentrations of hydrogen sulfide in different sample media.

The electrochemical cell of the present invention as shown in FIG. 1 generally at 20 and includes a first or sulfide electrode assembly 22 which is the well known sulfide electrode comprising case 24, one end of which is capped or closed with pellet 26 of substantially pure $Ag_2S$ preferably ground to form a plane outer surface 28. The interior of sulfide electrode assembly 22 is filled with a reference solution 30, typically an aqueous saturated solution of AgCl and KCl, and a reference electrode 31, usually of Ag/AgCl is immersed therein. The reference electrode is connected to an external lead 32. Sulfide electrode 22 is disposed within hollow enclosure 33 which is made of a substantially chemically inert, electrically insulating material such as epoxy, polytetrafluorethylene or the like.

In contact with the sulfide sensing portion of the sulfide electrode and disposed within enclosure 38 is a body of electrolyte 34 which will be described in detail hereafter.

Membrane 36, which is permeable to $H_2S$, is supported about its periphery by one side of spacer ring 38. The latter is sealed across an opening into enclosure 33 by elastomeric O-Ring 40. Spacer ring 38 and O-Ring 40 are so dimensioned that membrane 36 is immediately adjacent the planar surface 28 of the $Ag_2S$ pellet 26 so that the interspace between surface 28 and membrane 36 contains an extremely thin film, preferably less than a mil inch, of electrolyte.

Membrane 36 is formed of a microporous hydrophobic material which is sufficiently porous or gas permeable such that $H_2S$ will readily diffuse therethrough, but the membrane will not permit any passage of liquids or ionic constituents dissolved in the liquids. Additionally, of course, the membranes should be substantially inert with respect to the chemical constituents with which it is intended to come in contact and particularly with respect to hydrogen sulfide. The membrane additionally should be made of a substantially insulating electrical material. To this end, suitable membranes can be formed of polytetrafluoroethylene, polyvinylchloride, polypropylene and similar materials. A typical such membrane formed of polytetrafluorethylene has an average pore size of 0.5–0.6 microns, an average free area of as much as 80% or more and is typically about 5 mil inches thick.

It will be appreciated that while any of a large number of the standard reference electrodes, such as Ag/AgCl, can be used to provide the other half cell complementing the silver sulfide electrode in the electrochemical cell of the invention, silver based reference systems will tend to drift badly if sulfide ions which are formed in electrolyte 34 by diffusion of $H_2S$ thereinto actually reach the reference element. This is also true of other reference systems which are attacked by or which will provide contact potentials with respect to sulfide ions.

Consequently, the preferred embodiment of the present invention uses as a reference electrode 42 disposed in enclosure 33 and also contracting electrolyte 34, a fluoride ion-sensitive electrode of the type described in U.S. Pat. No. 3,431,182 issued Mar. 4, 1969 to M. S. Frant, or a pH glass-type electrode or a sodium sensitive glass type electrode. The latter two glass electrodes, while relatively insensitive to the presence of sulfide ion and certainly not attacked by sulfide ion, require that the pH be extremely carefully controlled. Hence it is preferred that the fluoride electrode be used. As is well known, the sensitive element in the latter is a lanthanum fluoride crystalline membrane or pellet 44 which shows no interference when exposed to to solutions containing sulfide ion, bisulfide ion, or $H_2S$. The internal electrolyte 46 of electrode 42 is typically an aqueous solution saturated with respect to AgCl and KCl and $10^{-3}M$ in fluoride. Contracting electrolyte 46 is the usual Ag/AgCl reference electrode 48 which is connected to external lead 50.

Consequently, the internal electrolyte 34 of the cell of the invention is an aqueous solution in which a fixed level of fluoride ion is provided by the dissociation of a readily soluble fluoride salt such as NaF, KF or the like. In addition, it is preferred that electrolyte 34 contain a pH buffer, typically a phosphate or citric acid at 0.1M, so that the pH is not permitted to change readily. It is preferred that the pH of electrolyte 34 be maintained in the range of between about pH 4 to pH 7, being preferred at around pH 5, but the electrochemical cell of the invention will provide suitable results with electrolyte 34 at any pH less than about substantially 9. Lastly, but very importantly, electrolyte 34 preferably contains an antioxidant for sulfide ions. It has now been found that the use of an antioxidant permits one to measure sulfide ions at quite low levels, e.g. less than $1 \times 10^{-4}M$. In the preferred embodiment, the antioxidant is ascorbic acid in a concentration of about 0.1M.

The operation of the $H_2S$ sensing electrochemical cell of the present invention is based upon potentiometric measurement of the change in sulfide ions in the thin film of electrolyte 34 between surface 28 and membrane 36 caused by diffusion of the hydrogen sulfide through membrane 36. Hydrogen sulfide will of course diffuse in and out of electrolyte 34 until the partial pressure of the hydrogen sulfide on both sides of the membrane is equalized. The hydrogen sulfide diffusing through the membrane 36 will dissolve in the water of electrolyte 34 and will ionize reversibly to form bisulfide and sulfide ions according to the following equations:

(1)  $H_2S \rightleftarrows H^+ + HS^-$
(2)  $HS^- \rightleftarrows H^+ + S^=$ wherein (3)  $\dfrac{[H^+][S^=]}{[HS^-]} = K_1$ and (4)  $\dfrac{[H^+][HS^-]}{H_2S} = K_2$ $K_1$ and $K_2$ being the known dissociation constants.

As noted, electrolyte 34 is maintained at a pH which is acid, i.e. around 5. Hence if one solves equation 3 for $(HS^-)$ and substitutes the result into equation 4 one then obtains the following:

(5)  $[S^=] [H^+]^2 = K_1 \cdot K_2 [H_2S]$

Because the value of $[H^+]$ is a constant by virtue of the pH buffer in electrolyte 34, we can then rewrite equation (5) as:

(6)  $[S^=] = K_4 [H_2S]$ where $K_4$ equals $K_1 \cdot K_2 \cdot K_3$, where $K_3 = [H^+]^2$. It will be apparent immediately that the slope of the electrochemical cell will be a typical divalent Nernstian slope and in fact this is what occurs inasmuch as the electrochemical potential developed by the entire cell is dependent solely upon the sulfide concentration in electrolyte 34 detected by sulfide electrode 22.

In operation of the system, one may operate in either of two basic modes. In the first mode, one can directly measure the partial vapor pressure of free $H_2S$ simply by placing the outside of membrane 36 against the sample solution in question and permitting the free hydrogen sulfide in the sample solution to diffuse across the membrane until the partial pressure on both sides of the latter is substantially the same. At that point an equilibrium will be reached and the potential developed by the cell of the present invention will be indicative of the free $H_2S$ content of the sample.

In the second mode, one can measure total sulfide. In order to do so, the sample solution is acidified to convert all sulfide ions and bisulfide ions to hydrogen sulfide. And this can be done by adjusting the pH of the sample solution to well below a pH of 5. In either mode, it is preferred to adjust the osmoality and temperature of the sample solution to match that of electrolyte 34, particularly to minimize transport of water vapor through membrane 36. Also one may wish to add antioxidants to the sample solution in order to prevent the oxidation of sulfide ions by the ambient atmosphere.

An illustrative method of the use of the electrode will now be described. Each of output leads 32 and 50 respectively from the sulfide and from the fluoride electrode are connected as respective inputs across a suitable high impedance potentiometric measuring device such as a standard pH meter. The exterior surface of membrane 36 is contacted with a series of different standardizing solutions each of which contains a different known concentration of H$_2$S. The potential developed by the cell of the invention in response to each of the solutions is then recorded and the values of potential are plotted on a linear scale against the logarithm of concentration of the gas.

EXAMPLE I

An electrochemical cell according to the invention was made using a sulfide sensitive electrode (Orion Research Incorporated Model 94–16) as the primary electrode and a fluoride sensitive electrode (Orion Research Incorporated Model 94–09) as a reference electrode. The internal reference solution of the cell was an aqueous solution of $1 \times 10^{-4}$M NaF, $1 \times 10^{-1}$M ascorbic acid and $2 \times 10^{-1}$M citrate all at a pH of 6.0. The cell membrane was a polytetrafluorethylene porous sheet as heretofore described.

The sample solution was prepared by first providing an aqueous solution of $2 \times 10^{-}$M citrate and $1 \times 10^{-1}$ ascorbic acid, all at a pH of 3.2. The cell was immersed in 100 ml. of this sample solution with the membrane contacting the latter. One ml. of an aqueous solution of $1 \times 10^{-5}$M Na$_2$S was added to the sample solution and the cell potential read. Subsequent additives of appropriate amounts of Na$_2$S solutions, each differing by a decade in molarity were made at spaced intervals. A strip chart (voltage-time) of the response of the cell to each addition is shown in FIG. 2. The various potential levels reached in the strip chart are each identified by the molarity of the free H$_2$S in the corresponding sample solution.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. Method of determining the hydrogen sulfide content of a sample solution comprising the steps of:
    1. diffusing the hydrogen sulfide through a membrane into a pH buffered electrolyte containing a fixed concentration of reference ions until the partial pressures of the hydrogen sulfide on both sides of the membrane are in equilibrium, said membrane being permeable to hydrogen sulfide but substantially impermeable to liquids and ionic constituents and
    2. measuring the potential developed between an ion sensitive electrode having a substantially Nernstian response to the activity of sulfide ions and an ion sensitive electrode having a substantially Nernstian response to the reference ions but not responsive to sulfide ions, said electrodes being in operating contact with the electrolyte.

2. A method in accordance with claim 1 further including the step of adjusting the temperature of said sample solution to equal the temperature of the electrolyte.

3. A method in accordance with claim 1 further including the step of adding an anti-oxidant to the sample solution.

4. A method in accordance with claim 1 further including the step of acidifying the sample solution to convert substantially all sulfide ions and bisulfide ions contained therein to hydrogen sulfide.

* * * * *